E. OLIVER.
TIRE FILLING COMPOSITION.
APPLICATION FILED MAR. 18, 1912.
1,123,787.
Patented Jan. 5, 1915.
2 SHEETS—SHEET 1.
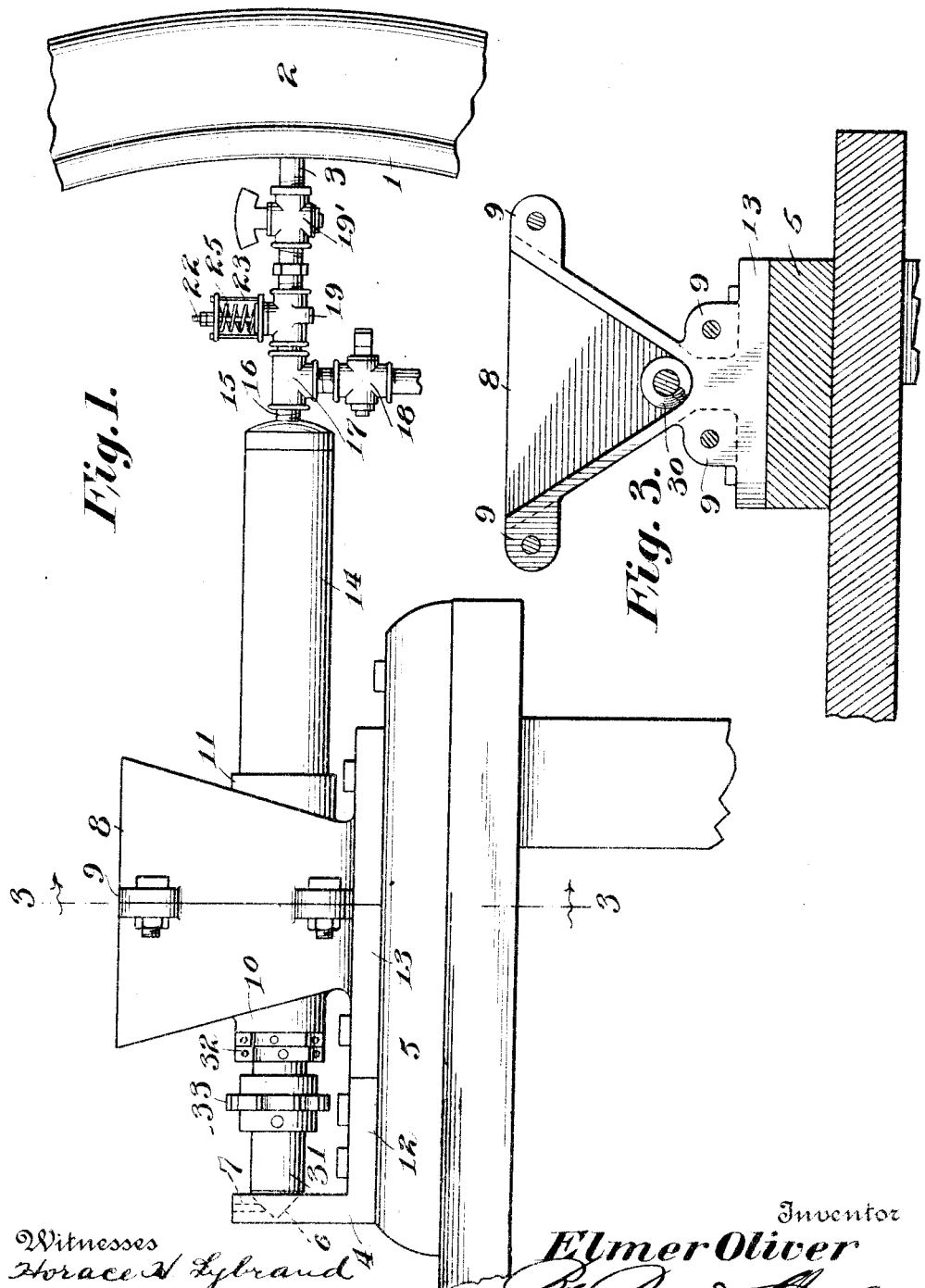
Witnesses
Horace N Lybrand
C. C. Hines.
Inventor
Elmer Oliver
By [signature]
Attorney

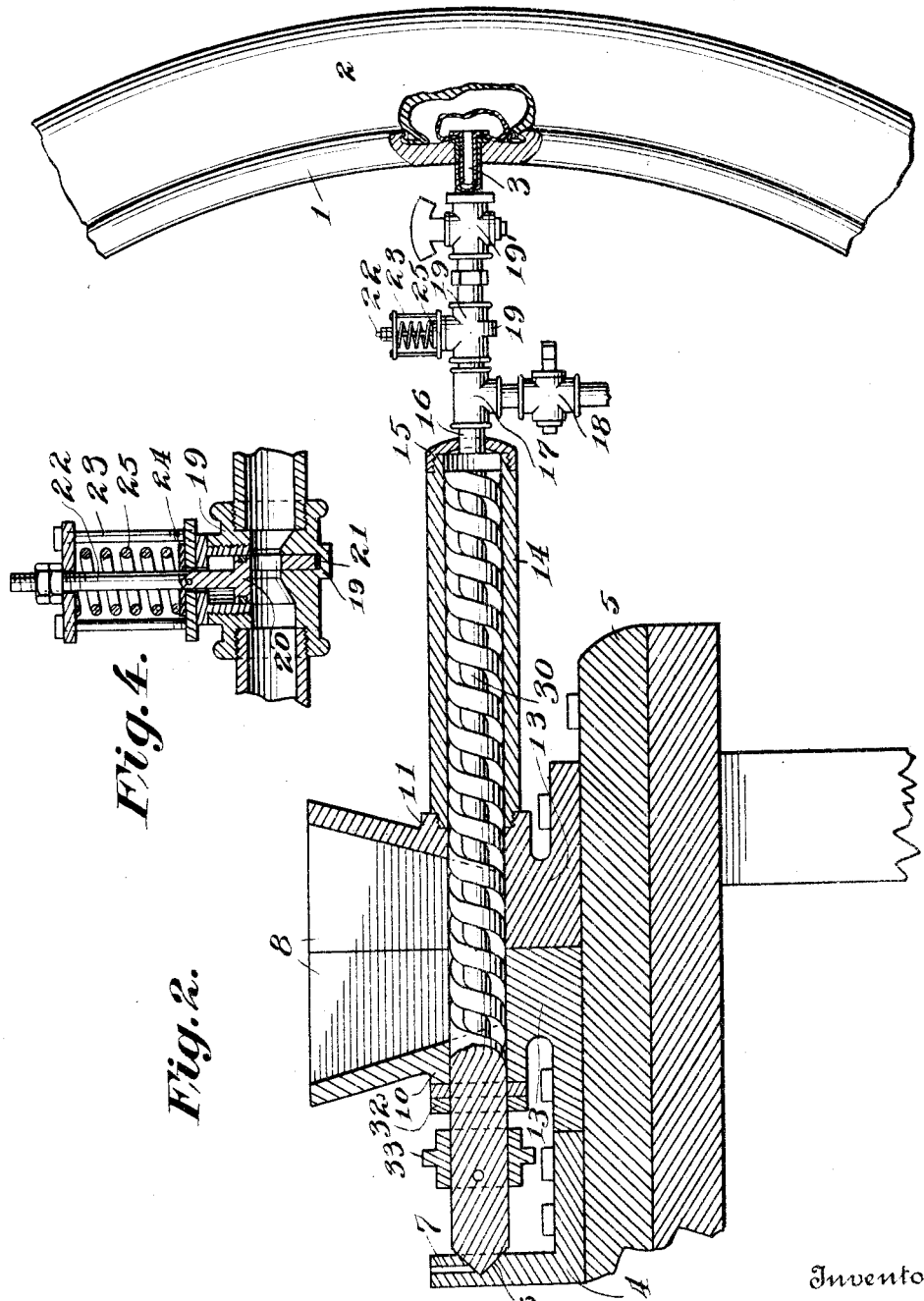

UNITED STATES PATENT OFFICE.

ELMER OLIVER, OF DAYTONA, FLORIDA.

TIRE-FILLING COMPOSITION.

1,123,787.  Specification of Letters Patent.  Patented Jan. 5, 1915.

Application filed March 13, 1912. Serial No. 684,497.

*To all whom it may concern:*

Be it known that I, ELMER OLIVER, a citizen of the United States, residing at Daytona, in the county of Volusia and State of Florida, have invented certain new and useful Improvements in Tire-Filling Compositions, of which the following is a specification.

This invention relates to a novel composition of matter for use as a filler for resilient tires.

One object of the invention is to provide a filler which will adhere firmly to the inner wall of the tire, which will stand all heat conditions to which the tire is subjected, and which will not melt, harden or soften to an objectionable degree, crumble or otherwise deteriorate with age or lose its elasticity.

A further object of the invention is to provide a normally solid filler possessing the defined characteristics and which may be rendered plastic and simultaneously forced into any ordinary type of tire, thus obviating the necessity of injecting the filler in a liquid state and using solvents, gases or other agents liable to cause injury to the tire, or of requiring tires of special type or construction.

A still further object of the invention is to provide a composition of matter by means of which single or double tube tires may be easily and expeditiously filled, and a strong, durable, puncture-proof and highly resilient tire produced.

In carrying my invention into practice I provide a filler which is normally solid and resilient and capable of resisting heat beyond any temperature to which the tire is subjected, say up to 180° F., but which is capable of being rendered plastic under a predetermined degree of pressure and frictional heat, so that by the use of suitable mechanical means for producing mechanical pressure and heat it may be rendered plastic and forced into the tire. To this end, the filler is formed of a composition of blown cotton seed oil (corn or other vegetable oil), gilsonite, flowers of sulfur, copper oxid, zinc oxid and whiting. The proportions in which these ingredients are combined depends upon the size of the tire and the load weight to be carried thereby, and hence the proportions may be varied, but the following combination has been found generally satisfactory: cotton seed or equivalent vegetable oil, 77 lbs.; gilsonite, 11 lbs.; flowers of sulfur, 14¼ lbs.; copper oxid, 1½ lbs.; zinc oxid, 3 lbs.; and whiting, 3¼ lbs.

In preparing the composition the gilsonite is placed with the oil in a vessel and the two heated until the gilsonite has melted and by constant stirring has been thoroughly mixed with the oil. The other ingredients are then successively and gradually added, with constant stirring, until a thorough combination is effected and a smooth mixture is obtained, which is then cooked until of the proper consistency. The resultant composition when cooled to atmospheric temperature is solid, will stand a temperature of 180° F. or more without melting, is highly resilient, and will not crumble, lose its elasticity, or otherwise deteriorate from age or the constant pressures to which it is subjected in use. As is well known, gilsonite is a solid hydrocarbon containing a large proportion of sulfur which must be driven off by heat in order to render such substance plastic for combination with the cotton seed oil. A large proportion of this sulfur is driven off during the preliminary heating of the oil and gilsonite, but a proportion remains, reducing the amount of flowers of sulfur required for vulcanizing action. As, however, the amount of sulfur contained in the gilsonite varies, and as it is important to prevent the retention of an excess amount in the mixture, or of any free sulfur in the completed product, I employ the copper and zinc oxids both as fillers and sulfur reducing agents. These oxids, in some manner, as practical experience shows, reduce or render innocuous any excess of sulfur, and promote amalgamation and vulcanization of the mixture, so that a permanently elastic product will be formed which will not harden or become brittle under atmospheric influences. In this respect the product differs from any other like product with which I am familiar. For the purpose of introducing this composition, I force the same into the tire under pressure and sufficient heat to render it plastic for introduction by suitable mechanical means, such as a filling machine of the type shown in the accompanying drawings, in which:—

Figure 1 is a view illustrating the machine in side elevation and also showing the arrangement of the machine relative to a tire to be filled. Fig. 2 is a view, partly in vertical section and partly in elevation of the same. Fig. 3 is a view taken in the plane indicated by the line 3—3 of Fig. 1 and showing the interior of the hopper and the worm screw for feeding the hard filling substance forward from the hopper. Fig. 4 is an enlarged detail view of the pressure gage comprised in the machine.

In Figs. 1 and 2, 1 is a wheel rim or other suitable form, and 2 is a tire, of rubber or other suitable resilient material; the said tire having one or more filling tubes 3 that extend through the rim, as clearly shown in Fig. 2.

My novel machine is designed to be connected to the tube 3 and to force the hard filling substance through the said tube and into the tire.

Among other elements the machine comprises an upright 4 fixed on a suitable support 5 and having a socket 6 and a lubricant duct 7 leading thereto. Also fixed on the support 5 is a hopper 8 which is preferably, though not necessarily, formed in two sections; the said sections being clamped together, as at 9. The bottom of the hopper described a part of the circle, Fig. 3, and the hopper is provided at its ends with tubular projections 10 and 11. It will also be noticed here that the upright 4 has a base 1 and that the base 12 of the hopper abuts against said base 12, this with a view of lending increased stability to the hopper and strength to the machine as a whole.

Threaded into the forward tubular projection 11 of the hopper is a cylindrical and smooth-foremember 14 that is provided at its forward end with a cap 15 having a threaded nipple 16. This nipple serves for the connection of a T-coupling 17 on the depending arm of which is a cock 18. Connected to the opposite end of the coupling 17, with reference to the nipple 16, is the casing 19 of a pressure-gage, and connected, in turn, to the said casing 19 is a cock 19' designed to be connected with the filling tube 3 of the tire.

The pressure gage combines in addition to the casing 19 a piston 20 having a depending and apertured cut-off portion 21. The rod 22 of piston 20 extends upward through a frame 23 and is provided at 24 with an abutment between which and the top of the frame 23 a spring 25 is interposed. The said spring serves by exerting downward pressure on the abutment 24 to yieldingly hold the piston 20 and the apertured cut-off 21 against upward movement. When, however, the pressure in the casing becomes excessive such pressure serves to raise the piston 20 and the cut-off 21 against the action of the spring 25, whereupon the said cut-off diminishes the size of the passage through the casing 19 and consequently lessens the supply of the hard filling substance to the tire. Attention is also directed here to the fact that when the tire is filled and a certain predetermined pressure is therein contained the cut-off 21 will close communication between the tire and the means best shown in Fig. 2 for supplying the filling substance under pressure to the tire. The means referred to comprises a worm screw 30 rotatable about its axis in the hopper bottom and the cylindrical section 14. The said worm screw is carried by a shaft 31 that extends rearward through the tubular projection 10 of the hopper and has a thrust bearing in the socket 6 of the upright 4. By reason of this, rearward movement of the worm screw incidental to rotation thereof is effectually prevented. It will also be noticed by reference to Figs. 1 and 2 that forward movement of the worm screw 30 during rotation thereof is effectually prevented by one or two jam nuts 32 mounted on the shaft 31 and disposed immediately in rear of the hopper projection 10, and that the said nuts may be used to adjust the worm screw as occasion demands.

The shaft 31 may be rotated by any suitable means to rotate the screw 30. I prefer, however, to effect the rotation of the said shaft through the medium of a sprocket belt (not shown) connecting a suitable source of power and a sprocket gear 33 fixed on the shaft.

In practice, the machine being connected to the filling tube or tubes 3 of the tire 2, which is mounted upon a wheel rim 1 or a form corresponding to the rim on which it is to be used, the filling substance, broken into lumps about the size of an egg, is supplied to the hopper 8 and the worm screw set into action, whereby such substance will be forced forward by the worm screw and into the tire. Under the mechanical pressure and friction to which the material is subjected by the action of the screw and contact with the walls of the cylinder sufficient heat is generated to render the substance plastic, and it is thereby forced in a plastic condition into the tire which it fills to the desired density. As the filling substance is forced in, the air contained in the tire is forced out through suitable apertures which are closed by the filler when the tire is completely filled. The worm filler as it is introduced permanently adheres to the inner wall of the tire and thus becomes a permanent part thereof, and after it cools becomes a solid backing which possesses the desirable characteristics herein before mentioned. When the tire is filled to the desired density and pressure, the cut-off 21 of the pressure-gage will isolate the tire from the machine. The raising of the abutment 24 of the pressure-gage will thereupon apprise the operator of the machine that the tire is fully charged, and the tire is then detached from the machine. It will, of course, be understood that the machine may be heated to supplement the frictional heat for the purpose of increasing the plasticity of the filling substance when required or desired.

It will be observed that by the composition described a filling possessing desirable qualities is not only provided, but that the use of gases, chemicals and solvents liable to injure the tire is also avoided, and these and other objections incident to employing a primarily liquid filler obviated.

Having thus described the invention, what I claim as new is:—

The herein-described tire filler, comprising a solid resilient composition of cotton seed oil, 77 lbs., gilsonite, 11 lbs., flowers of sulfur, 14½ lbs., copper oxid, 1½ lbs., zinc oxid, 3 lbs., and whiting, 3¼ lbs.

In testimony whereof I affix my signature in presence of two witnesses.

ELMER OLIVER.

Witnesses:
J. D. Menis,
F. F. Smith.